United States Patent Office 3,549,198
Patented Dec. 22, 1970

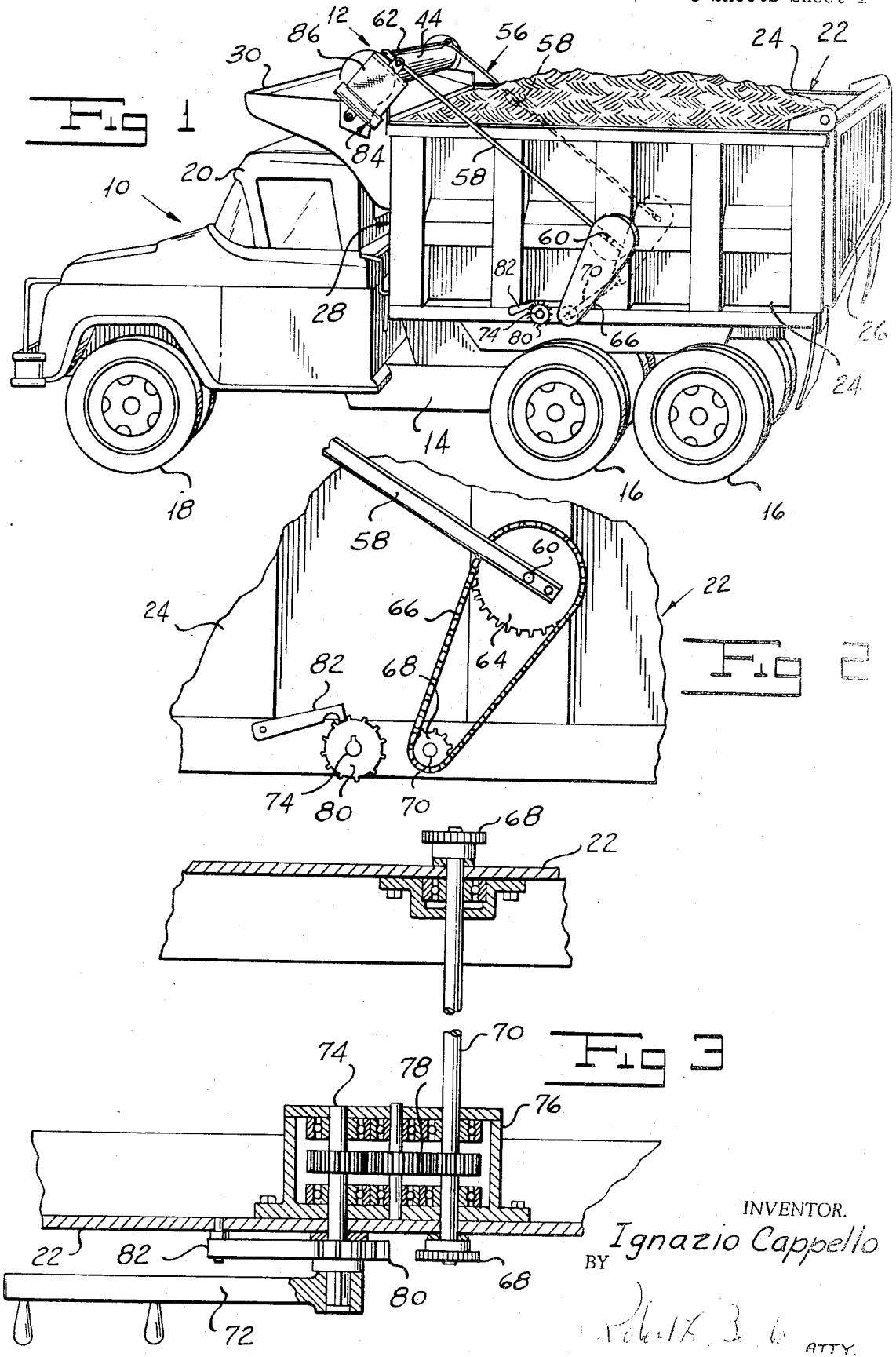

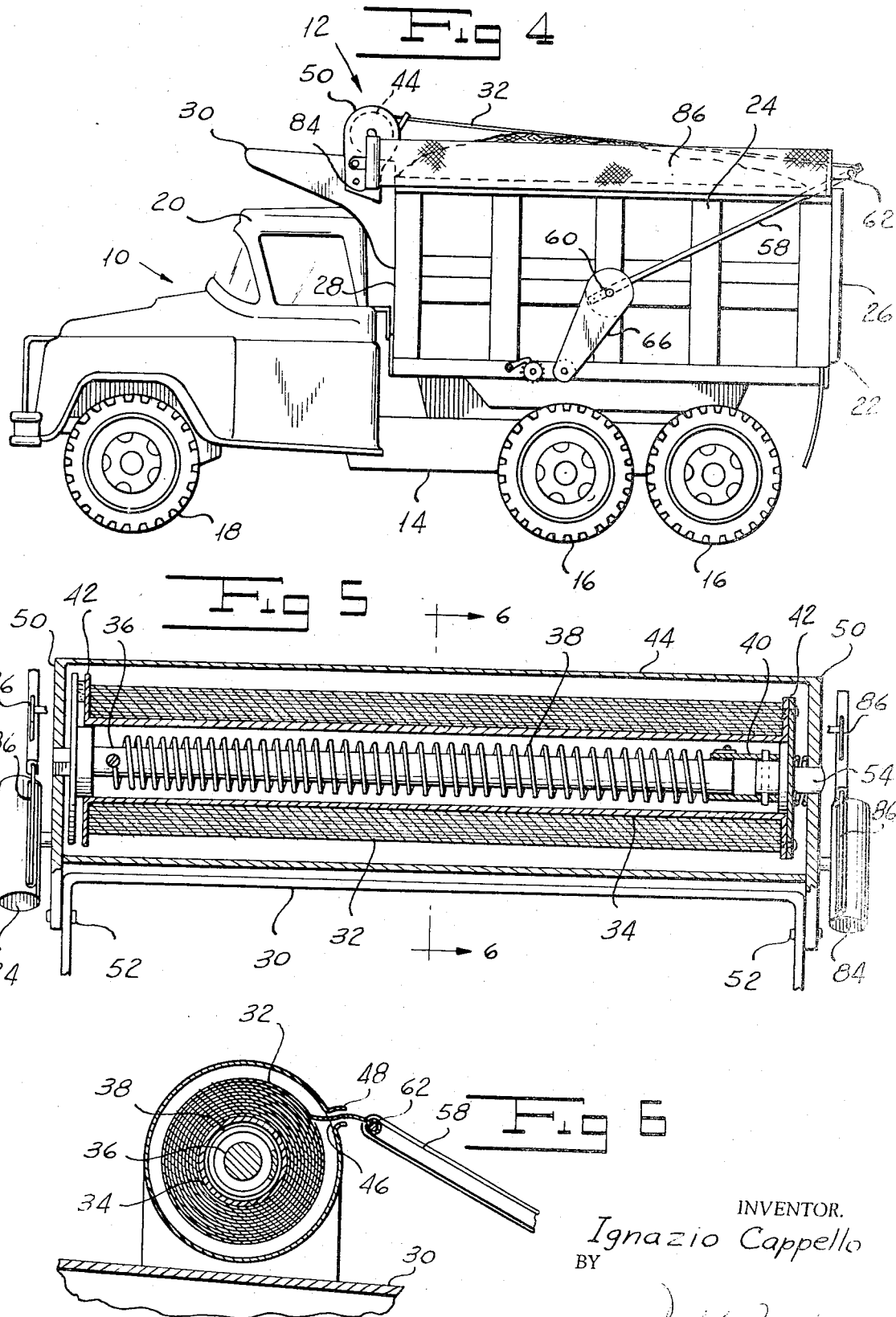

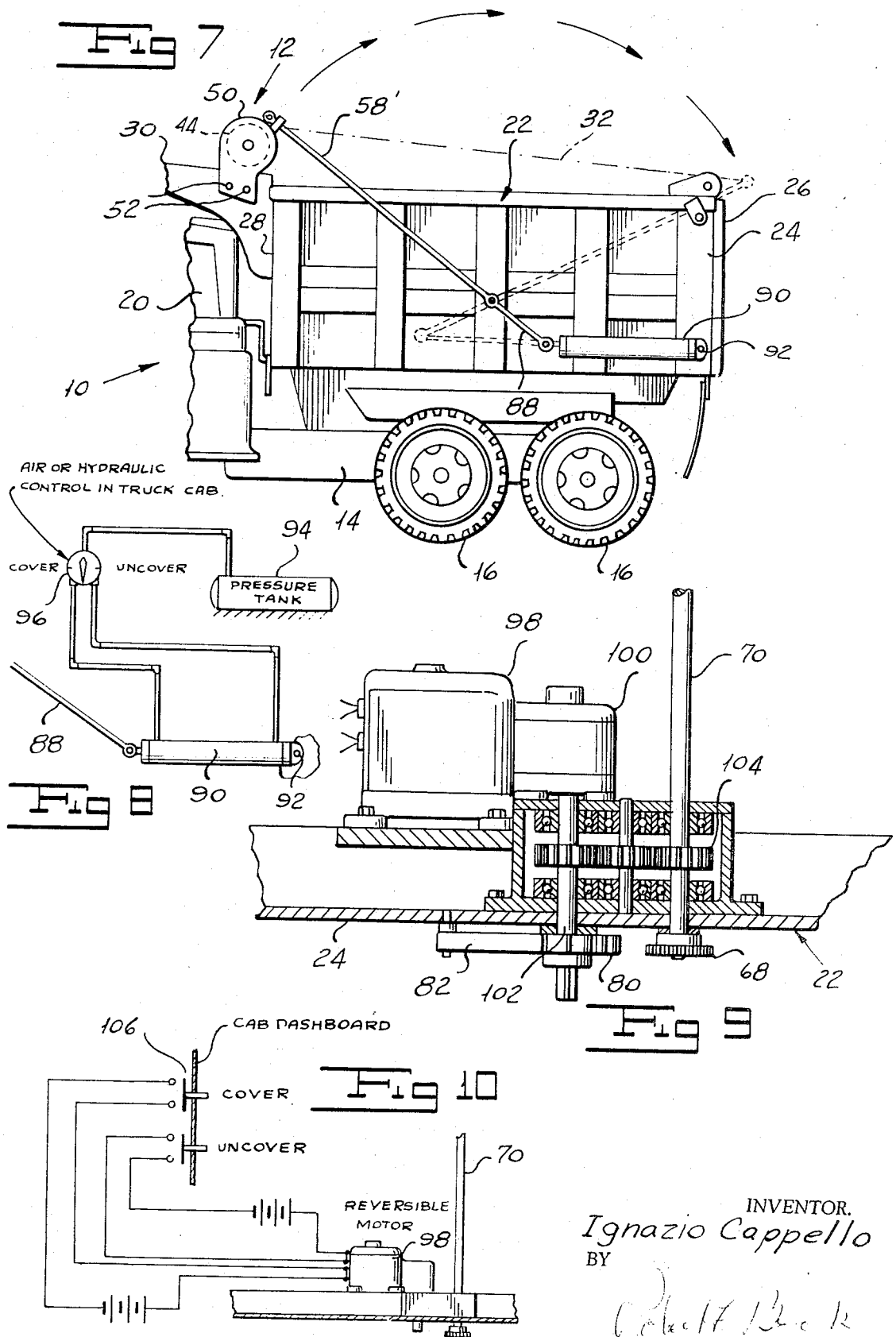

3,549,198
DUMP TRUCK BODY COVER
Ignazio Cappello, Saddle Brook, N.J., assignor to Pioneer Coveralls, Inc., Oxford, Mass., a corporation of Massachusetts
Continuation-in-part of application Ser. No. 524,620, Feb. 2, 1966. This application Dec. 29, 1966, Ser. No. 605,718
Int. Cl. B60p 7/04
U.S. Cl. 296—100         17 Claims

ABSTRACT OF THE DISCLOSURE

A cover for a dump truck body longitudinally movable from a retracted position upon a reel mounted upon the front end of the truck body to an extended position overlying the truck body by a yoke pivotably attached to the sides of the body.

---

This application is a continuation-in-part of my prior application, Ser. No. 524,620, filed Feb. 2, 1966, and now abandoned.

The present invention generally relates to a dump truck body cover and more particularly a cover which is longitudinally movable between an extended position and a retracted position.

An object of the present invention is to provide a cover for a load carrying body such as a dump truck body which has an open top with the cover being flexible and normally wound on a drum or reel mounted on the forward part of the body above the cab of the truck thereby enabling free access to the dump truck body.

One of the problems facing dump truck operators is the spillage of dirt, rocks and the like from the dump truck body onto the highway which results in danger to other motorists and in some jurisdictions penalties are levied against dump truck operators when material from the truck body spills or falls onto the highway. Accordingly, it is another object of the present invention to provide a cover which overcomes such problems by retaining material in the dump truck body and which is easily moved between extended and retracted positions by a novel operating mechanism that may either be manually operated or power operated.

A further object of this invention is to provide a cover for a load carrying body in accordance with the preceding objects in which the operating mechanism includes a swingable yoke mounted on the sides of the truck body which one end attached to the free end of the cover and the other end portion equipped with a handle or power device for swinging the yoke about a transverse axis for moving the free end of the cover in an arcuate manner between the retracted and extended positions thereof.

Still another object of the present invention is to provide a load cover for dump truck bodies and the like which is simple in construction, easy to attach to dump truck bodies with very little modification, easy to operate, effective in use and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a dump truck, with the cover installed thereon and in retracted position;

FIG. 2 is a detail side elevation, showing the operating means for the side members;

FIG. 3 is a horizontal sectional view therethrough;

FIG. 4 is a side elevational view of a dump track with the cover of the present invention installed thereon;

FIG. 5 is a longitudinal sectional view of the cover reel and housing;

FIG. 6 is a transverse sectional view taken along section line 6—6 in FIG. 5, illustrating further details of the cover reel;

FIG. 7 is a side elevational view illustrating a power operated embodiment of the invention;

FIG. 8 is a diagrammatic view of a fluid circuit for operating the side members;

FIG. 9 is a horizontal sectional view of a motor driven power device for the side members; and FIG. 10 is a diagrammatic view of the electric circuit therefor.

Referring now specfically to the drawings, the dump truck 10 to which the cover 12 of the present invention is attached is conventional in all major respects and includes the usual frame or chassis 14, rear wheels 16, front steerable wheels 18, an operator's cab 20 and a dump type load carrying body 22. The load body 22 is defined by side walls 24, a tail gate 26 and a front wall at 28 with a forwardly extending cab protecting member 30.

The cover 12 includes an elongated flexible canvas member or tarpaulin 32 having a width and length generally equal to the width and length of the body 22. The tarpaulin 32 has one end attached to a drum or reel 34 journaled on a stationary shaft 36. A torsion spring 38 is mounted on shaft 36 with one end attached thereto and the other end attached to a sleeve 40 rigid with an end plate 42 of the reel 34, thus biasing the reel 34 to wind the tarpaulin 32 onto the reel.

A generally cylindrical housing 44 encircles the reel 34 and includes an access slot 46 in the wall thereof which is defined by a pair of projecting flanges 48. The housing 44 includes end plates 50 which depend below the housing 44 and are attached to the cab protecting member 30 by suitable fasteners 52 and with the slot 46 facing the tail gate 26.

A generally U-shaped operating rod or yoke 56 has side members 58 pivotally attached to a side wall 24 of the body 22 by a pivot pin 60 so that the transverse member 62 of the yoke 56 which is attached to the free end of the tarpaulin, as by a loop therein, will swing in an arcuate path from a retracted position adjacent the housing 44 to an extended position just rearwardly of the upper end of the gate 26.

As shown more in detail in FIGS. 2 and 3, the pivot pin 60 at each side of the body 22 has fixed thereto a sprocket wheel 64 over which a chain 66 extends to a sprocket 68 mounted on a cross shaft 70 extending from side to side of the body 22 and journaled in suitable bearings in the side walls of the body. The operation of the cross shaft 70 will cause the side members 58 to swing about the axis of the pivot pins 60 on which these side members are mounted, thereby to retract or extend the cover tarpaulin 32.

In the form of the invention shown in FIGS. 2 and 3, the cross shaft 70 is operated by a crank 72 mounted on a countershaft 74 journaled in a gear box 76 attached to one side wall of the body 22. The countershaft 74 is connected through suitable gearing 78 with the cross shaft 70 so that upon rotation of the shaft 74 by the crank 72, the shaft 70 will be turned in a corresponding direction.

The countershaft 74 is provided also with a gear 80, the teeth of which are spaced apart a sufficient distance so as to receive therebetween an end of a latch 82 pivotally supported on a side of the body 22. Since spur gearing is used, together with sprocket gearing, the engagement of the latch 82 with the teeth of the gear 80 will lock the side members 58 in set positions against turning movement until the latch 82 has been released.

Pivotally mounted on each of the end plates 50, laterally thereof as viewed in FIG. 5, is a housing 84 enclosing a suitable reel which may be constructed in the manner of the reel shown in FIGS. 5 and 6. Wound on the reel within each housing 84 and extendable therefrom is a strip of material 86, such as a suitable tarpaulin material. This strip of tarpaulin material 86 is thus wound at one end on each reel in the housing 84 and at its opposite end, it is connected with the transverse member 62 in such relation as to extend down over the upper edge of the body 22 substantially closing the lateral opening at each side of the tarpaulin 32, as shown in FIG. 4. In other words, the upright edge strips 86 form confining barriers or walls overlapping the upper edges of the sides of the body 22 laterally outside of said wall to a height substantially equal to the height of the tarpaulin 32. This will prevent the blowing of the refuse material, dirt or other lading, out from under the tarpaulin over the upper edges of the body walls during transportation and will serve effectively to confine the material in the body.

The tarpaulin 32, together with the side strips 86, may be left in extended positions when the dump body is elevated to dumping position since the tail gate 26 can still swing outwardly from the body edge thereof. The cover and strips will retain effectively any dirt and other lading from spilling or falling over highways and streets and will also protect the load from rain or snow to a certain degree to prevent increase in the weight of the load by absorption of moisture, which sometimes will result in a truck being overloaded, especially on long trips. The mounting of the housings and reels above the cab provides complete access to the body for loading and also reduces the possibility of loading machinery causing damage to the cover and the housings.

After the material has been hauled to its destination, the tarpaulin 32 and the side strips 86 may be restored to the reels by reversing the action of the hand crank 72, thereby swinging the side members 58 from the position shown in FIG. 4 to the position shown in FIG. 1. The spring reels attached to these flexible members will cause them to be retracted into the respective housings substantially as illustratd in FIG. 1, where they will remain until the body is loaded.

In the embodiment illustrated in FIG. 7, one or both of the side members 58' has an extension 88 extending from the pivot pin 60 for pivotal connection with a fluid pressure actuated piston and cylinder assembly 90. The other end of the cylinder assembly 90 is pivoted to the side wall 24, as at 92. The cylinder assembly 90 may be double-acting hydraulic cylinder or an air cylinder, according to the source of fluid pressure available on a particular truck. A conventional fluid circuit for operating such a cylinder is illustrated in FIG. 8 wherein the pressure tank is shown at 94 and is connected with the cylinder through suitable fluid lines controlled by a manually actuated valve 96, which should be located in the cab of the truck. Other than in the use of a power operated mechanism, this structure functions in the same manner as described above in connection with FIGS. 1 to 6.

Provision may also be made for operating the cross shaft 70 by an electric motor, as illustrated in FIGS. 9 and 10. As here illustrated, the electric motor is shown at 98 connected through suitable speed reducing gearing 100, with a countershaft 102 which, in turn, is connected through gearing 104 with the cross shaft 70. Upon operation of the motor 98, the shaft 70 will be rotated to move the side members 58 between the positions shown in FIGS. 1 and 4, as described above.

The countershaft 102 may be provided with the locking means 80–82, if desired, for holding the side members in locked position. A conventional electric circuit for controlling the reversible motor 98 is shown in FIG. 10 including a switch 106 located in the cab of the truck to be used by the operator for controlling the positions of the side members.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a motor vehicle body having upstanding sides, an open top, and a discharge opening at the rear end thereof, said body being adapted to receive a pile of loose material therein, of a cover for the body comprising an elongated strip of flat flexible material of a width substantially equal the width of the body and at least equal the length of the body, a roller mounted on the front end portion of the body and connected with the strip of material and having the entire width of the strip of material received flatwise upon the roller for rolling up the material thereon, and means mounted on the body and connected with the opposite end of the strip of material for initially lifting the strip in an elevated position over the pile of material and then down into flat engagement with the pile of material to hold the material in place during transportation, and means for maintaining the strip under tension.

2. The combination as defined in claim 1 wherein said cover moving means includes a yoke having side members pivotally connected to the side walls of the body and a transverse member attached to an end edge of said cover, and means connected to a least one of said side members for swinging the yoke in a fore and aft direction in relation to the body.

3. The combination as defined in claim 2 wherein said means connected to said side member includes at least one laterally extending handle connected with the side member for manually moving the cover.

4. The combination as defined in claim 2 wherein said means connected to said side member includes at least one fluid pressure operated piston and cylinder assembly connected to the side member in spaced relation to the point of pivotal support and adapted to be connected to the side walls of the body for power operation of the cover.

5. The combination as defined in claim 1 wherein said roller includes a drum type reel having the cover wound thereon when in retracted position, a housing enclosing said reel and including a slot for passage of the cover, and means for supporting said housing on the body.

6. The combination as defined in claim 5 wherein said housing supporting means includes end plates with depending portions, the load body including a forwardly projecting cab protecting member, said depending portions adapted to be attached to the cab protecting member for orientation forwardly of the open top of the body.

7. The combination as defined in claim 5 wherein said reel means comprises a hollow drum mounted on a stationary shaft, a torsion spring encircling the shaft with one end attached thereto and the other end connected with said drum.

8. The combination defined in claim 1 including a gearing unit mounted on a side of the body and operatively connected with the strip moving means for effecting movement thereof.

9. The combination defined in claim 1 including a fluid power assembly mounted on a side of the body and operatively connected with the strip moving means for effective movement thereof.

10. In combination with a motor vehicle body having upstanding sides, an open top and a discharge opening at the rear end thereof, a first reel, said reel having a flexible cover wound thereon, one end of said cover being attached to said reel and the other end being free thereof, means for mounting said first reel across the front end of the body, a cross member connected to the free end of said cover, side members pivotably mounted on the sides of the body, one end of each of said members being connected to said cross member, second and third reels mounted upright on the body, one each at opposite ends of said first reel, said second and third reels having flexible covers wound thereon, one end of each of said covers being attached to one of said second and third reels and the other end being free thereof and attached to said cross member, and means for swinging said side members to move said cross member to the rear end of the body thereby extending the flexible cover of said first reel substantially over the top of said body and the flexible covers of said second and third reels along opposite sides of said body.

11. The combination set out in claim 10 wherein the flexible covers of said second and third reels when extended overlie the upper edge of the body and substantially close the space between the flexible cover of said first reel and the sides of the body.

12. The combination set out in claim 10 wherein the cover of said first reel is in the form of a tarpaulin having dimensional characteristics approximating those of the open top of said body and wherein said reels include means for winding said flexible covers on said reels.

13. The combination set out in claim 10 wherein said first reel includes a drum type reel and a housing enclosing said reel having a slot for passage of the cover and wherein said means for mounting said first reel includes housing supporting end plates with depending portions, said depending portions beging attached to the body.

14. The combination set out in claim 13 wherein said second and third reels are pivotably mounted on said housing supporting end plates.

15. The combination set out in claim 10 wherein said means for swinging said side members includes a shaft, means to rotate said shaft, a sprocket mounted on said shaft on one side of the body, a sprocket wheel coaxial with the pivot of one of said members and rigidly attached to said side member, and an endless chain engaging said sprocket and said sprocket wheel whereby rotation of said shaft pivots said side member.

16. The combination set out in claim 10 wherein said means for swinging said side members includes a fluid pressure operated piston and cylinder assembly mounted on one side of the body in spaced relation to the point of pivotal support and adapted to be connected to the side walls of the body for power operation of the cover.

17. In combination with a motor vehicle body having upstanding sides and an open top, said body being adapted to receive a pile of loose material therein, a cover for said body comprising an elongated strip of flat flexible material of a width substantially equal to the width of said body and at least equal to the length of said body, a roller mounted on the front end portion of said body and connected with said strip of material and having the entire width of said strip of material received flatwise upon the roller for rolling up said material thereon, and means mounted on said body and connected with the opposite end of said strip of material for moving said opposite end toward the rear end portion of said body while maintaining said strip of material in a lengthwise tensioned condition and for relevating said opposite end of said strip of material relative to said body during its initial extension and for subsequently lowering said one end of said strip of material relative to said body during subsequent movement of said strip of material toward a fully extended position.

References Cited
UNITED STATES PATENTS

| | | | |
|---|---|---|---|
| 1,441,495 | 1/1923 | Calvin | 160—68 |
| 1,537,817 | 5/1925 | Figenbaum | 160—68X |
| 3,146,824 | 9/1964 | Veilleux | 296—98X |
| 3,168,345 | 2/1965 | Roberts et al. | 296—100 |

BENJAMIN HERSH, Primary Examiner

R. R. SONG, Assistant Examiner